US011235704B2

(12) United States Patent
Wilson et al.

(10) Patent No.: US 11,235,704 B2
(45) Date of Patent: Feb. 1, 2022

(54) REARVIEW DEVICE WITH DETENT ASSEMBLY (71) Applicant: MOTHERSON INNOVATIONS COMPANY LIMITED, London (GB)

(72) Inventors: Douglas James Wilson, Troy, MI (US); Joel James Gough, Troy, MI (US)

(73) Assignee: Motherson Innovations Company Limited, London (GB)

( * ) Notice: Subject to any disclaimer, the term of this patent is extended or adjusted under 35 U.S.C. 154(b) by 162 days.

(21) Appl. No.: 16/539,559

(22) Filed: Aug. 13, 2019

(65) Prior Publication Data

US 2021/0046876 A1 Feb. 18, 2021

(51) Int. Cl.
*B60R 1/076* (2006.01)

(52) U.S. Cl.
CPC .................. *B60R 1/076* (2013.01)

(58) Field of Classification Search
CPC .................................................. B60R 1/076
USPC ....................................................... 359/841
See application file for complete search history.

(56) References Cited

U.S. PATENT DOCUMENTS

| | | | | |
|---|---|---|---|---|
| 4,186,905 A * | 2/1980 | Brudy | ................ | B60R 1/0617 16/321 |
| 4,789,232 A * | 12/1988 | Urbanek | ................ | B60R 1/076 248/475.1 |
| 5,384,660 A * | 1/1995 | Oishi | ................ | B60R 1/074 248/478 |
| 6,286,968 B1 * | 9/2001 | Sailer | ................ | B60R 1/0617 248/478 |
| 7,052,148 B2 * | 5/2006 | Kuo | ................ | B60R 1/076 359/841 |
| 7,448,762 B2 * | 11/2008 | Su | ................ | B60R 1/076 248/478 |
| 7,546,997 B2 * | 6/2009 | Van Stiphout | ......... | B60R 1/076 248/476 |
| 7,735,196 B2 * | 6/2010 | Centmayer | ......... | B60R 1/0617 16/334 |
| 8,366,284 B2 * | 2/2013 | Flynn | ................ | B60R 1/074 359/841 |
| 2005/0219722 A1 * | 10/2005 | Watrous | ................ | B60R 1/076 359/841 |
| 2017/0106799 A1 * | 4/2017 | Di Gusto | ................ | B60R 1/076 |

FOREIGN PATENT DOCUMENTS

GB          2340805       *    3/2000

* cited by examiner

*Primary Examiner* — Ricky D Shafer
(74) *Attorney, Agent, or Firm* — Jones Day (57) ABSTRACT

A rearview device for a vehicle includes a rearview device head, a rearview device base including a base frame, and a detent assembly which is configured to control rotation of the rearview device head with respect to the rearview device base. The detent assembly is configured to lock and unlock rotation of the rearview device head with respect to the rearview device base without vertical movement of the rearview device head with respect to the rearview device base.

9 Claims, 7 Drawing Sheets

Section A-A

FIG. 4A

Section A-A

FIG. 4B

Section A-A

REARVIEW DEVICE WITH DETENT ASSEMBLY

TECHNICAL FIELD

The present disclosure relates generally to rearview devices for vehicles and, more particularly, to a rearview device with a detent assembly which may allow rotation of a rearview device head with respect to a rearview device base without vertical movement of the rearview device head.

BACKGROUND

Motor vehicles typically have two external rearview assemblies. Such assemblies typically have a mirror head that is designed to rotate about a substantially vertical pivot axis in both forward and rearward directions. The mirror head is typically held in its driving or home position by a detent mechanism which allows manual movement of the head to a parked position and manual movement to a forward position. There are a number of reasons for this. One reason is safety. By having a rearview head that can "break away" to move from a deployed position to a parked or forward position, injury to people can be avoided or at least minimized. Furthermore, damage to the mirror head can be avoided or at least minimized by allowing it to move when it hits obstructions. It is also useful to have a mirror head that can be parked, that is rotated to a position substantially parallel to the side of the vehicle, so as to narrow the effective width of the vehicle.

Modern external rearview devices make use of a detent mechanism to hold a mirror head in its home position as well as facilitate rearward and forward folding operations. These detent mechanisms consist of two cam surfaces which are arranged such that they engage when the mirror head is in its home position relative to the mirror base. The cam surfaces engage as a result of a force applied by a compression device, usually in the form of a spring. When a sufficient external force is applied to the mirror head, the engaged cams are forced to slide against each other and counteract the force applied by the spring in order to disengage. Once disengaged, the cams are free to slide past each other in order to allow the mirror head to rotate.

The disengagement of the cams in the detent mechanism of a mirror results in the mirror head lifting off of the mirror base. This lifting is unnecessarily restrictive to the execution of some mirror designs. Additionally, this lifting creates small gaps in between the mirror head and mirror base which results in significant noise. Generally, this noise is prevented by integrating additional noise gaskets and seals into the design of a mirror assembly, adding additional cost and complexity.

EP Patent No. 0881124 describes a rearview mirror head that is rotatably mounted to a spigot which is secured to a mounting bracket. A detent holds the mirror head in a desired position relative to the mounting bracket. A spring acts between the mounting bracket and mirror head to hold the detent in its engaged position. An actuator is driven by an electric motor drive so that, upon initial operation while the detent is engaged to resist rotation of said mirror head a force is applied to compress the spring, thereby causing movement of the mirror head so that the detent disengages. During subsequent operation, the actuator rotates the mirror head about the spigot.

EP Patent No. 1886873 describes a retaining hinged connection, with a simple assembly operation, having fewer components. An outside mirror is engaged with such a retaining hinged connection. The connection is achieved in that the retaining axle component is designed with at least one retaining element and advantageously including a compression spring. This disclosure eliminates the use of bolts for securing the hinge assembly.

U.S. Pat. No. 8,544,151 describes a pivoting detent joint with selective positional engagement for a vehicle mirror assembly. The detent joint includes an arm detent ring defined by a continuous circular arrangement of a combination of arm locking teeth and alignment teeth. A base detent ring has a complementary arrangement to the arm detent ring and is defined by a continuous circular arrangement of a combination of base locking teeth and alignment channels. The arm locking teeth of the arm detent ring engage the base locking teeth of the base detent ring in a releasable interlocking engagement only when all of the alignment teeth are received into a complementary alignment channel so that positioning of a support arm relative to a carrier base is limited to specifically defined orientations.

DE Patent Application Publication No. 102013212339 describes a hinge device for a pivotable mounting of an outside mirror on a vehicle having a first articulated arm having a first and a second bearing portion and at least one locking portion, a second articulated arm having an end portion having a bearing bush. The locking bolt extends through the first bearing portion, the bearing bush and the second bearing portion and is fixed axially in the locking portion.

BRIEF SUMMARY OF THE DRAWINGS

In one aspect, a rearview device for a vehicle includes a rearview device head, a rearview device base including a base frame, and a detent assembly which is configured to control rotation of the rearview device head with respect to the rearview device base. The detent assembly is configured to lock and unlock rotation of the rearview device head with respect to the rearview device base without vertical movement of the rearview device head with respect to the rearview device base.

In another aspect, a rearview device for a vehicle includes a rearview device head, a rearview device base including a base frame, and a detent system which is configured to lock and unlock rotation of the rearview device head with respect to the rearview device base without vertical movement of the rearview device head with respect to the rearview device base. The detent system includes a top detent plate, an upper detent plate, a lower detent plate, a bottom detent plate, and a biasing element. The biasing element provides a force to said upper detent plate and said lower detent plate. The top detent plate includes a first cam surface and the upper detent plate includes a second cam surface. The first cam surface of the top detent plate and the second cam surface of the upper detent plate are operable to engage in a first state and said first cam surface of the top detent plate and the second cam surface of the upper detent plate are operable to disengage in a second state. The lower detent plate includes a third cam surface and the bottom detent plate includes a fourth cam surface. The third cam surface of the lower detent plate and the fourth cam surface of the bottom detent plate are operable to engage in a first state and the third cam surface of the lower detent plate and the fourth cam surface of the bottom detent plate are operable to disengage in a second state.

BRIEF DESCRIPTION

The foregoing summary, as well as the following detailed description, will be better understood when read in conjunction with the appended drawings. For the purpose of illustration, certain embodiments of the present disclosure are shown in the drawings. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present disclosure and, together with the description, serve to explain advantages and principles consistent with the disclosure, in which.

DETAILED DESCRIPTION

Before explaining at least one example of the disclosure in detail, it is to be understood that the disclosure is not limited in its application to the details of construction and to the arrangements of the components set forth in the following description or illustrated in the drawings. The figures and written description are provided to teach any person skilled in the art to make and use the disclosures for which patent protection is sought. The disclosure is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present disclosures will require numerous implementation—specific decisions to achieve the developer's ultimate goal for the commercial embodiment. While these efforts may be time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the figures and are not intended to limit the scope of the disclosure or the appended claims. Further, it should be understood that any one of the features of the disclosure may be used separately or in combination with other features. Other systems, methods, features, and advantages of the disclosure will be or become apparent to one with skill in the art upon examination of the figures and the detailed description. It is intended that all such additional systems, methods, features, and advantages be included within this description, be within the scope of the present disclosure, and be protected by the accompanying claims.

Figure 1:
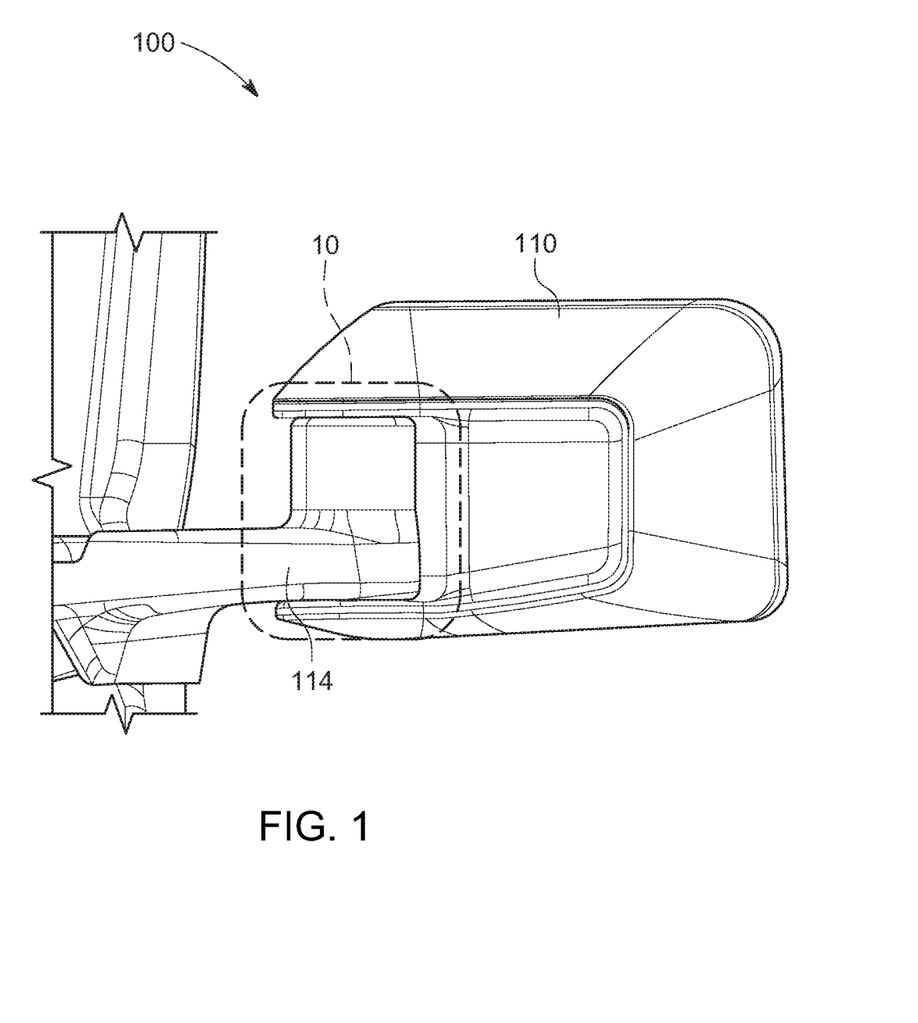
FIG. 1 illustrates a perspective view of an example of a rearview device in accordance with aspects of the present disclosure.

FIG. 1 illustrates a perspective view of an example of a rearview device 100 with a mirror head 110 and a mirror base 114 in accordance with aspects of the present disclosure. Mirror base 114 is attached to a vehicle (not shown) via detent assembly 10 such that its position relative to the equipped vehicle is fixed. The operation of detent assembly 10 will be further discussed later with reference to FIG. 2. Mirror head 110 is attached to mirror base 114 and is arranged in its in home position. In its home position, mirror head 110 is operable to hold a reflective element (not shown), such that a driver is able to view rearward of the vehicle.

Figure 2:
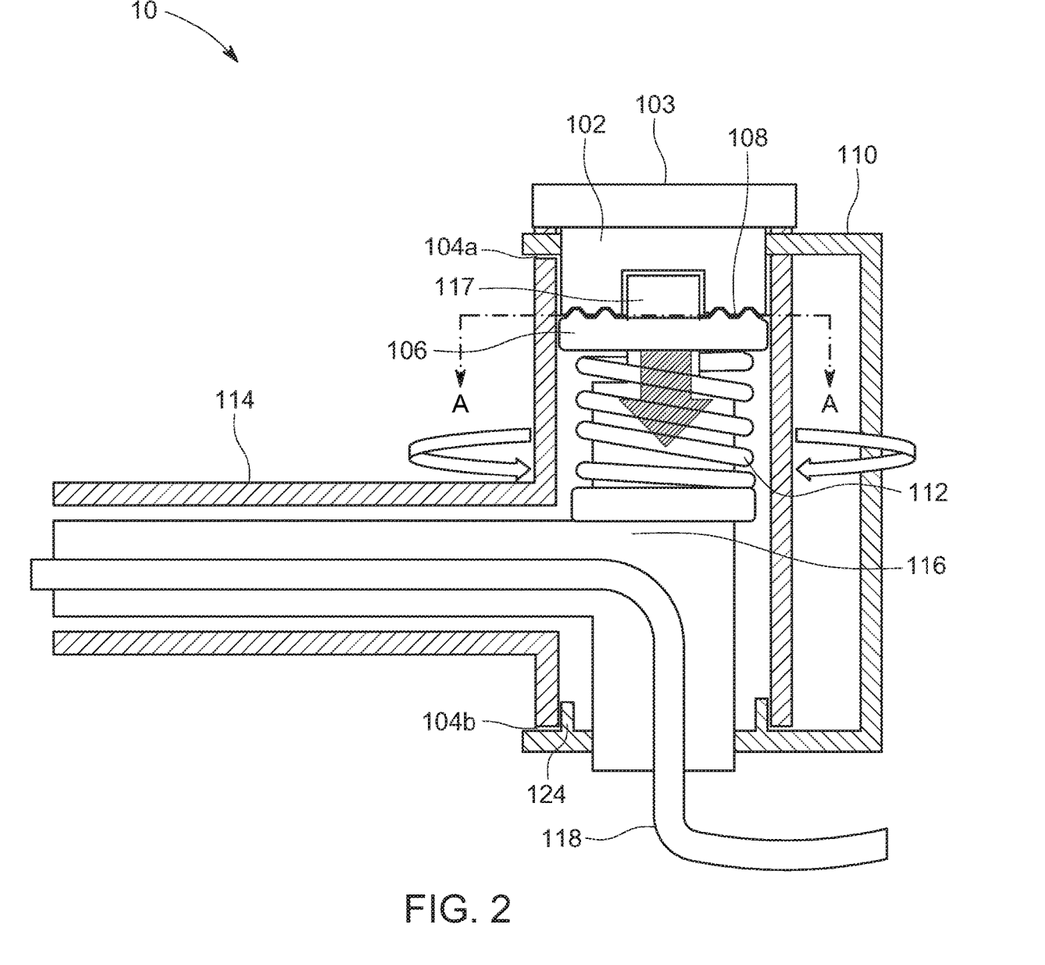
FIG. 2 illustrates an internal, expanded view of a detent assembly of a rearview device in accordance with aspects of the present disclosure.

FIG. 2 illustrates an internal, expanded view of detent assembly 10 of rearview device 100 of FIG. 1 in accordance with aspects of the present disclosure.

Referring to FIG. 2, detent assembly 10 is housed between a portion of the mirror head 110 and mirror base 114. Referring back to FIG. 1 simultaneously with FIG. 2, only the detent assembly 10 of the rearview device 100 is illustrated in FIG. 2 so only those portions of the mirror head 110 and the mirror base 114 in detent assembly 10 are illustrated. Accordingly, the portion of the mirror head 110 shown in FIG. 2 is a part of an inner wall of the casing of the mirror head 110 so that all parts shown in FIG. 2 which extend beyond the portions of the mirror head 110 which are shown are housed in the casing. For example, this includes a wire harness 118, the bottom of a base frame 116, and the top of a top detent plate 102, all of which are described in more detail below. The other components of detent assembly 10 are housed in mirror base 114. As shown by the rotation arrows of FIG. 2, detent assembly 10 controls rotation of mirror head 110 with respect to stationary mirror base 114.

Still referring to FIG. 2, detent assembly 10 includes a top detent plate 102, a top cap 103, an upper detent plate 106, a biasing element 112, a base frame 116, and a protrusion 124. Base frame 116 further includes anti-rotation feature 117. In this non-limiting example embodiment, biasing element 112 is illustrated as a spring. In other embodiments biasing element 112 maybe a shape memory alloy, a magnetorheological fluid, an electrorheological fluid, hydraulics or any other system or method for applying a biasing force.

Top cap 103 is operable to seal the top proximal end of detent assembly 10. Top cap 103 is arranged to be above top detent plate 102 and operate as a fixed surface. With top cap 103 being fixed in place, it provides a surface against which biasing element 112 may push upper detent plate 106 and top detent plate 102.

Protrusion 124 is arranged on mirror head 110 such that it fits inside mirror base 114. The arrangement of protrusion 124 in relation to mirror base 114 forms wind noise gap overlap 104b. Additionally, top detent plate 102 is arranged such that it overlaps the gap between mirror head 110 and mirror base 114 in order to form wind noise gap overlap 104a. Since wind noise gap overlap 104a and wind noise gap overlap 104b are provided at the interfaces between mirror head 110, mirror base 114, and the outside environment there is no need for additional wind noise gaskets or seals that are required in traditional rearview mirror assemblies.

A wire harness 118 may extend through base frame 116 to provide electrical or other connections between components of rearview device 100 and the vehicle.

Top detent plate 102 further comprises a cam surface 120 and upper detent plate 106 further comprises a cam surface 122. The interface between cam surface 120 and cam surface 122 forms detent interface 108. The operation of detent interface 108 will now be described with additional reference to FIGS. 3A-3B.

Figure 3A:
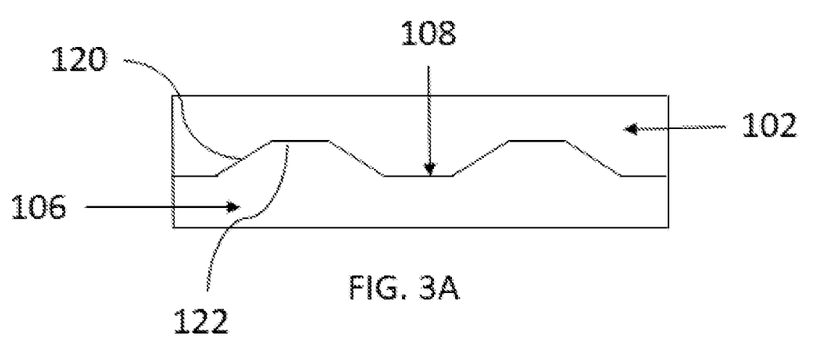
FIG. 3A illustrates a cross-sectional view of a detent interface in accordance with aspects of the present disclosure.

FIG. 3A illustrates a cross-sectional view of detent interface 108 when mirror head 110 is in a home position in accordance with aspects of the present disclosure.

Referring to FIG. 3A, when mirror head 110 is in its home position, cam surface 120 and cam surface 122 are aligned. When cam surface 120 and cam surface 122 are aligned, top detent plate 102 and upper detent plate 106 operate in an engaged state. This is because top cap 103 is fixed in position, so the alignment of cam surface 120 and cam surface 122 enables the biasing force applied by biasing element to push upper detent plate 106 towards top detent plate 102. The biasing force applied by biasing element 112 and the alignment of cam surface 120 and cam surface 122 holds mirror head 110 in place. Since top detent plate 102 is fixed to mirror head 110 it is only able to rotate when mirror head 110 rotates and upper detent plate 106 is rotationally locked by anti-rotation feature 117 and is only able to move along its vertical axis. The operation of upper detent plate 106 and anti-rotation feature 117 will now be discussed with additional reference to FIG. 4.

Figure 4A:
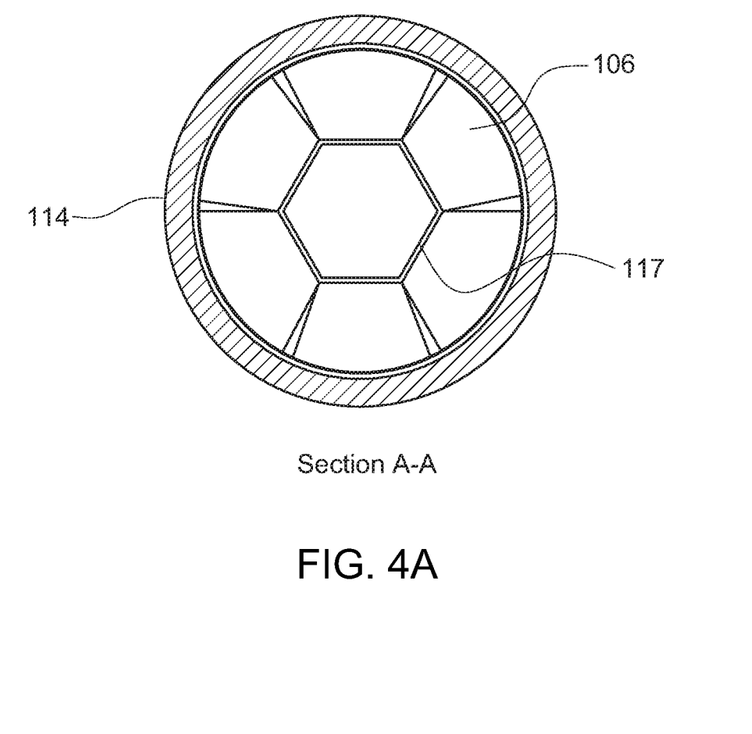
FIG. 4A illustrates a first example of a cross-sectional view of the detent assembly of FIG. 2 along the line A-A in accordance with aspects of the present disclosure.
Figure 4B:
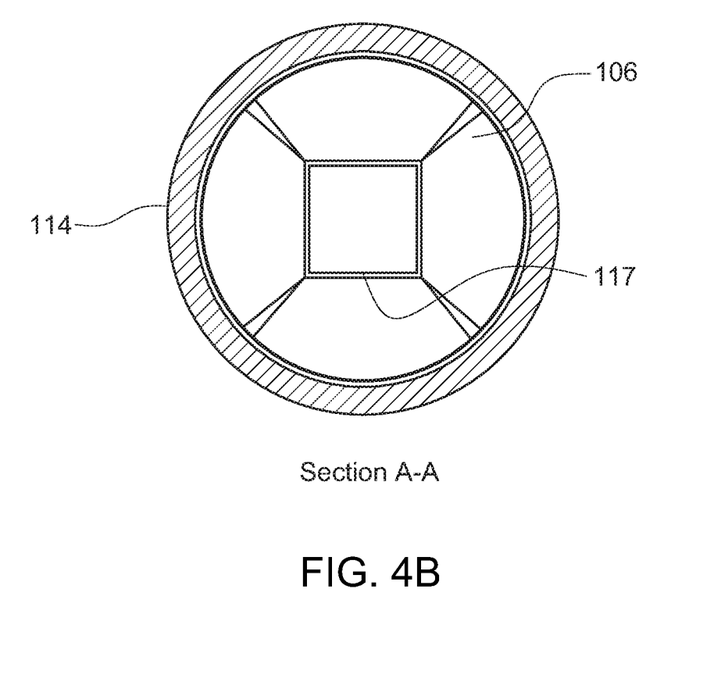
FIG. 4B illustrates a second example of a cross-sectional view of the detent assembly of FIG. 2 along the line A-A in accordance with aspects of the present disclosure.
Figure 4C:
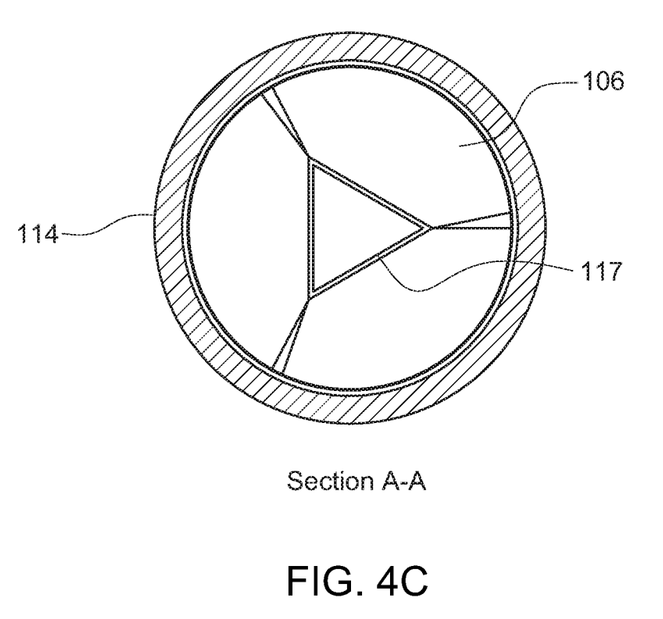
FIG. 4C illustrates a third example of a cross-sectional view of the detent assembly of FIG. 2 along the line A-A in accordance with aspects of the present disclosure.

FIGS. 4A, 4B, and 4C illustrate example cross-sectional views of the detent assembly of FIG. 2 along the line A-A in accordance with aspects of the present disclosure.

As illustrated in the figures, the cross-sectional view includes mirror base 114, upper detent plate 106, and anti-rotation feature 117.

When mirror head 110 is in its home position, upper detent plate 106 is biased towards top detent plate 102 by biasing element 112 as described above in reference to the discussion of FIG. 3A. Anti-rotation feature 117 prevents the rotation of upper detent plate 106. In these non-limiting example embodiment, anti-rotation feature 117 is shaped like a hexagon and upper detent plate 106 includes detent features which create an inner space having a hexagonal shape (see FIG. 4A), anti-rotation feature 117 is shaped like a square and upper detent plate 106 includes detent features which create an inner space having a square shape (see FIG. 4B), or anti-rotation feature 117 is shaped like a triangle and upper detent plate 106 includes detent features which create an inner space having a triangular shape. In other embodiments, anti-rotation feature 117 and the inner space of upper detent plate 106 may have any shape such that the rotation of upper detent plate 106 is restricted.

Further, in these example embodiment anti-rotation feature 117 has a width that is approximately 30% of upper detent plate 106. In other embodiments, anti-rotation feature 117 may have any width as long as it is able to prevent the rotation of upper detent plate 106.

Referring back to FIG. 2, in operation suppose that mirror head 110 is in its home position. When mirror head 110 is in its home position, biasing element 112 provides a force to upper detent plate 106. The biasing force applied pushes upper detent plate 106 against top detent plate 102 as shown in FIG. 3A. When mirror head 110 is in its home position, cam surface 120 and cam surface 122 are aligned, meaning that they are able to engage with each other. The engagement of the peaks and valleys of cam surface 120 and cam surface 122 in addition to the biasing force of biasing element 112 prevent the rotation of mirror head 110.

The peaks and valleys of each of cam surface 120 and cam surface 122 along with the biasing force of biasing element 112 can be chosen such an external force greater than a predetermined threshold is required to move mirror head 110 from its home position. Suppose that an external force that is below the predetermined threshold is applied to mirror head 110. In this case, mirror head 110 tries to rotate in the direction of the external force that was applied. Since mirror head 110 and top detent plate 102 are engaged, as mirror head 110 tries to rotate, so does top detent plate 102.

As top detent plate 102 begins to rotate, the peaks and valleys of cam surface 120 tries to slide past the peaks and valleys of cam surface 122 of upper detent plate 106. Since the external force applied is below the predetermined threshold, cam surface 120 and cam surface 122 are not able to slide past each other and overcome the biasing force applied by biasing element 112 and therefore remain engaged.

The operation of detent assembly 10 when mirror head 110 is not in its home position will now be described with additional reference to FIG. 3B.

Figure 3B:
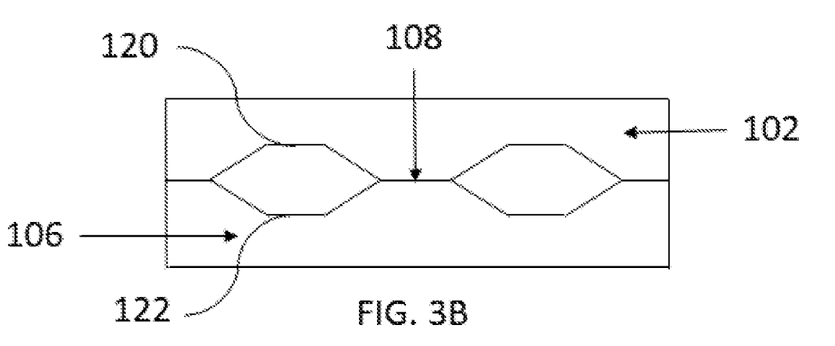
FIG. 3B illustrates a cross-sectional view of a detent interface in accordance with aspects of the present disclosure.

FIG. 3B illustrates a cross-sectional view of detent interface 108 when mirror head 110 is not in its home position in accordance with aspects of the present disclosure.

In operation, suppose that mirror head 110 is being manually folded to a stored position. Meaning that an external force is applied to mirror head 110 in a direction moving from the front of the equipped vehicle towards the rear of the vehicle. Also suppose that the external force applied is above a predetermined threshold and is sufficient in order to fold mirror head 110 inwards. As mirror head 110 begins to rotate, so does top detent plate 102 which forces cam surface 120 to slide against cam surface 122 of upper detent plate 106. However, since top detent plate 102 is fixed along its vertical axis and upper detent plate 106 is rotationally locked due to anti-rotation feature 117, the peaks and valleys of each of cam surface 120 and cam surface 122 slide against each other until they become unaligned.

The misalignment of cam surface 120 and cam surface 122 force upper detent plate 106 to be displaced away from top detent plate 102 against the biasing force of biasing element 112. The rotation of mirror head 110 continues until only the peaks of cam surface 120 and cam surface 122 are in contact with each other. At this time, top detent plate 102 and upper detent plate 106 are disengaged. With only the peaks of cam surface 120 and cam surface 122 in contact with each other, there is no interaction between the slopes of the cam surfaces, and the peaks of each cam surface are able to slide freely against each other.

An external force can be applied to mirror head 110 in order to return it to its home position. Again, cam surface 120 of top detent plate 102 and cam surface 122 upper detent plate 106 slide against each other until mirror head 110 reaches its home position. Once mirror head 110 is in its home position, the cam surface 120 and cam surface 122 become aligned and upper detent plate 106 can be pushed against top detent plate 102 by biasing element 112.

The operation of detent interface 108 operating when an external force is applied to mirror head 110 moving in a direction from the rear of the vehicle towards the front of the vehicle is identical to that described above. The force applied to mirror head 110 will force top detent plate 102 to begin to rotate and as it rotates, the interaction between cam surface 120 and cam surface 122 will move upper detent plate 106 downwards against the force of biasing element 112. Once disengaged, cam surface 120 of top detent plate 102 will be able to slide freely along cam surface 122 of upper detent plate 106. Once mirror head 110 is returned to its home position, the cam of each of top detent plate 102 and upper detent plate 106 are able to engage and are held together by the force applied by biasing element 112.

In the previous example embodiments, a top detent plate was used which served multiple functions simultaneously. A first function of the top detent plate is that it can be produced with a cam surface. The cam surface is then used along with the cam surface of an upper detent plate to perform various folding operations while not lifting the mirror head.

A second function not previously discussed is the rigidity added to the overall rearview device when using a top detent plate as described above. In traditional detent assemblies the mirror head lifts vertically from the mirror base in order to perform folding operations. The mirror base is provided with a pivot tube fixedly attached, which the mirror head may then rotate around. Due to construction, assembly, and operational requirements the mirror head may only be placed around the outer circumference of the pivot tube and there is no manner of fixing the mirror head on the pivot tubes inner circumference.

A detent assembly in accordance with the present disclosure is able to provide a top detent plate attached to the mirror head that can additionally fit inside the pivot tube of the mirror base. Additionally, the wind noise overlaps of the mirror head are able to fit inside the opposite end of the pivot tube of the mirror base. This design allows for greater rigidity, and in turn vibrational frequency, than that of traditional detent assemblies.

In previous embodiments, a non-lifting detent assembly was provided with a single set of detent plates. In other embodiments, a non-lifting detent assembly may be provided with more than one set of detent plates. An example of a non-lifting detent assembly using two sets of detent plates will now be discussed with reference to FIGS. 5A-5B.

Figure 5A:
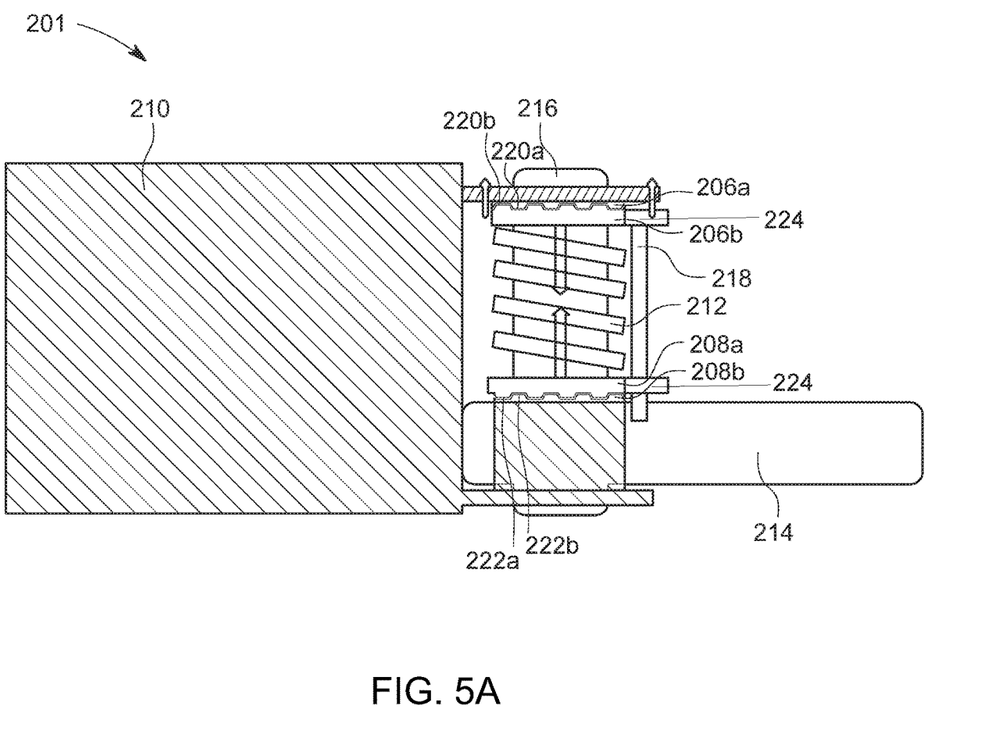
FIG. 5A illustrates a schematic view of a detent assembly using multiple detent plates in accordance with aspects of the present disclosure.

FIG. 5A illustrates a detent assembly 201 using two sets of detent plates in accordance with aspects of the present disclosure.

As shown in the figure, detent assembly 201 includes a mirror head 210, a mirror base 214, a top detent plate 206a, an upper detent plate 206b, a lower detent plate 208a, a bottom detent plate 208b, a biasing element 212, a pivot 216, and an anti-rotation feature 218.

Top detent plate 206a further comprises a cam surface 220a and upper detent plate 206b further comprises a cam surface 220b. Cam surface 220a and cam surface 220b are operable to be aligned when mirror head 110 is in its home position and unaligned when mirror head 110 is not in its home position.

Similarly, lower detent plate 208a further comprises a cam surface 222a and bottom detent plate 208b further comprises a cam surface 222b. Cam surface 222a and cam surface 222b are operable to be aligned when mirror head 110 is in its home position and unaligned when mirror head 110 is not in its home position.

Each of upper detent plate 206b and lower detent plate 208a further comprise an attachment element 224. Attachment element 224 allows each of upper detent plate 206b and lower detent plate 208a to attach to anti-rotation feature 218. The rotation locking of upper detent plate 206b and lower detent plate 208a using anti-rotation feature 218 will now be described with additional reference to FIG. 5B.

Figure 5B:
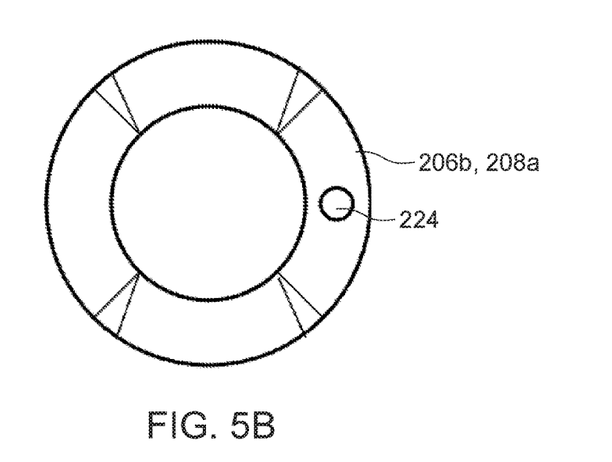
FIG. 5B illustrates a top planar view of the detent plates of FIG. 5A in accordance with aspects of the present disclosure.

FIG. 5B illustrates a top planar view of upper detent plate 206b and lower detent plate 208a of FIG. 5A.

As shown in the figure, each of upper detent plate 206b and lower detent plate 208a comprise an attachment element 224. In this example embodiment attachment element 224 is implemented as a through-hole, through which anti-rotation feature 218 may be inserted. Since anti-rotation feature 218 is attached to mirror base 214 and fixed in place, it is able to prevent the rotation of upper detent plate 206b and lower detent plate 208a. Since In other embodiments, attachment element 224 may be implemented as a clamp, connector, joint or any other mechanism that enables attachment to anti-rotation feature 218. In this embodiment attachment element 224 may be able to attach directly to anti-rotation feature 218. In further embodiments, anti-rotation feature 218 may include one or more attachment elements that may be implemented as a clamp, connector, joint, or any other mechanism that enables attachment to one or more detent plates in order to lock their rotation. In yet even further embodiments, anti-rotation feature 218 and each of detent plate 206b and 208a may both include attachment elements which may be used together or in combination to attach and rotationally lock detent plate 206a and 208b via anti-rotation feature 218.

Detent assembly 201 includes anti-rotation feature 218, which differs from anti-rotation feature 117 described above. Anti-rotation feature 218 is implemented as a shaft that runs parallel to biasing element 212 and through attachment element 224 of each of upper detent plate 206b and lower detent plate 208a. Anti-rotation feature 218 is fixed in position via a recess in mirror base 214. In this manner, since anti-rotation feature 218 is fixed to mirror base 214 it is able to rotationally lock lower detent plate 206a and lower detent plate 206b.

Referring back to FIG. 5A, the operation of detent assembly 201 when mirror head 210 is in its home position is nearly identical to the operation of detent assembly 10 of FIG. 2 when mirror head 110 is in its home position as described above. When mirror head 210 is in its home position, cam surface 220a is aligned with cam surface 220b and cam surface 222a is aligned with cam surface 222b. With each set of cam surfaces aligned biasing element 212 may apply a biasing force to each of upper detent plate 206b and lower detent plate 208a. The biasing force enables upper detent plate 206b to engage with top detent plate 206a and lower detent plate 208a to engage with bottom detent plate 208b. Mirror head 210 will be held in its home position until an external force is applied that is greater than the predetermined threshold that is required to disengage top detent plate 206a and upper detent plate 206b as well as lower detent plate 208a and bottom detent plate 208b.

Suppose that a sufficient external force is applied to mirror head 210 when it is in its home position to move it to a stored position. Meaning that an external force is applied to mirror head 210 in a direction moving from the front of the equipped vehicle towards the rear of the vehicle in order to fold mirror head 210 inwards. In this example embodiment, as mirror head 210 begins to rotate, so does top detent plate 206a and bottom detent plate 208b. Since upper detent plate 206b and lower detent plate 208b are rotationally locked by anti-rotation feature 218, as the cam surface 220a and cam surface 220b as well as cam surface 222a and cam surface 222b slide against each other and begin to become unaligned, upper detent plate 206b and lower detent plate 208a disengage and are displaced towards each other and compress biasing element 212.

Once each of upper detent plate 206*b* and lower detent plate 208*a* have been disengaged, they are not able to lock the rotation of mirror head 210 which is now able to rotate freely. When returning mirror head 210 to its home position cam surface 220*b* will align with cam surface 220*a* and cam surface 222*b* will align with cam surface 222*a*. When each of the cam surfaces align, the biasing force applied by biasing element 212 will once again enable Once engaged, the force applied by biasing element 212 will enable upper detent plate 206*b* to engage with top detent plate 206*a* and lower detent plate 208*a* to engage with bottom detent plate 208*b*.

It will be appreciated by those skilled in the art that changes could be made to the embodiments described above without departing from the broad inventive concept thereof. It is understood, therefore, that the disclosure disclosed herein is not limited to the particular embodiments disclosed, but it is intended to cover modifications within the spirit and scope of the present disclosure as defined by the appended claims.

REFERENCE LIST

| | |
|---|---|
| 10 | detent assembly |
| 100 | rearview device |
| 102 | top detent plate |
| 104a | wind noise gap overlap |
| 104b | wind noise gap overlap |
| 106 | upper detent plate |
| 108 | detent interface |
| 110 | mirror head |
| 112 | biasing element |
| 114 | mirror base |
| 116 | base frame |
| 117 | anti-rotation feature |
| 118 | wire harness |
| 201 | detent assembly |
| 206a | top detent plate |
| 206b | upper detent plate |
| 208a | lower detent plate |
| 208b | bottom detent plate |
| 212 | biasing element |
| 214 | mirror base |
| 216 | pivot |
| 218 | anti-rotation feature |
| 220a | cam surface |
| 220b | cam surface |
| 222a | cam surface |
| 222b | cam surface |
| 224 | attachment element |

What is claimed is:

1. A rearview device for a vehicle, comprising:
a rearview device head;
a rearview device base comprising a base frame; and
a detent system which is configured to control rotation of the rearview device head with respect to the rearview device base; and
an anti-rotation feature,
wherein said detent system is configured to lock and unlock rotation of said rearview device head with respect to said rearview device base without vertical movement of said rearview device head with respect to said rearview device base,
wherein said detent system, comprises:
a top detent plate; and
an upper detent plate,
wherein said top detent plate comprises a first cam surface,
wherein said upper detent plate comprises a second cam surface,
wherein said first cam surface of said top detent plate and said second cam surface of said upper detent plate are operable to engage in a first state and said first cam surface of said top detent plate and said second cam surface of said upper detent plate are operable to disengage in a second state,
wherein said upper detent plate comprises an aperture for receiving said anti-rotation feature,
wherein said anti-rotation feature is shaped to engage said upper detent plate to form an interference joint,
wherein said interference joint prevents the rotation of said upper detent plate around said anti-rotation feature,
wherein the rearview device further comprises a lower detent plate and a bottom detent plate,
wherein a biasing element provides a force to said upper detent plate and said lower detent plate
wherein said lower detent plate comprises a third cam surface and said bottom detent plate comprises a fourth cam surface, and
wherein said third cam surface of said lower detent plate and said fourth cam surface of said bottom detent plate are operable to engage in the first state and said third cam surface of said lower detent plate and said fourth cam surface of said bottom detent plate are operable to disengage in the second state,
wherein said anti-rotation feature is fixed to said base frame,
wherein said upper detent plate comprises a first attachment mechanism and said lower detent plate comprises a second attachment mechanism,
wherein said anti-rotation feature comprises a third attachment mechanism and a fourth attachment mechanism, and
wherein said third attachment mechanism is operable to attach to said first attachment mechanism of said upper detent plate and said fourth attachment mechanism is operable to attach to said second attachment mechanism of said lower detent plate.

2. The rearview device of claim 1, wherein said anti-rotation feature is shaped to enable unrestricted rotation of said top detent plate.

3. The rearview device of claim 2, wherein, in response to an external force being applied to said rearview device head, said top detent plate rotates and said upper detent plate transitions from said first state to said second state.

4. The rearview device of claim 3, wherein during the transition from said first state to said second state, said upper detent plate is displaced along its vertical axis away from said top detent plate.

5. The rearview device of claim 2,
wherein, in response to an external force being applied to said rearview device head, said top detent plate rotates and said upper detent plate transitions from said second state to said first state, and
wherein during the transition from said second state to said first state, said upper detent plate is biased along its vertical axis towards said top detent plate.

6. The rearview device of claim 1,
wherein said biasing element provides a force to said upper detent plate.

7. The rearview device of claim 6,
wherein said top detent plate, said upper detent plate, and said biasing element are housed within said rearview device base, and wherein said top detent plate extends into said rearview device head.

8. The rearview device of claim 1,
wherein said rearview device head comprises a protrusion, and
wherein said protrusion forms a wind noise gap overlap between said rearview device head and said rearview device base.

9. The rearview device of claim 1,
wherein said rearview device head has a proximal end located at the top detent plate and an opposite distal end, and
wherein said rearview device head is supported at said proximal end and said distal end by said rearview device base.

* * * * *